United States Patent
Jiang

(10) Patent No.: US 11,665,586 B2
(45) Date of Patent: May 30, 2023

(54) METHOD AND APPARATUS FOR DATA TRANSMISSION, ELECTRONIC DEVICE AND COMPUTER READABLE STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/588,346

(22) Filed: Sep. 30, 2019

(65) Prior Publication Data
US 2020/0029244 A1    Jan. 23, 2020

Related U.S. Application Data

(63) Continuation of application No. PCT/CN2017/094293, filed on Jul. 25, 2017.

(51) Int. Cl.
H04W 28/06 (2009.01)
H04W 28/04 (2009.01)
H04W 80/02 (2009.01)

(52) U.S. Cl.
CPC .......... *H04W 28/06* (2013.01); *H04W 28/04* (2013.01); *H04W 80/02* (2013.01)

(58) Field of Classification Search
CPC ..... H04W 28/06; H04W 28/04; H04W 80/02; H04L 47/32; H04L 47/34
See application file for complete search history.

(56) References Cited

U.S. PATENT DOCUMENTS

2009/0103478 A1* 4/2009 Sammour ............. H04L 69/324
                                              370/328
2009/0116399 A1* 5/2009 Ho ....................... H04L 47/32
                                              370/252

(Continued)

FOREIGN PATENT DOCUMENTS

| CN | 102469511 A | 5/2012 |
| CN | 104168214 A | 11/2014 |
| WO | 2009082848 A1 | 7/2009 |

OTHER PUBLICATIONS

International Search Report and Written Opinion to international application No. PCT/CN2017/094293, dated Nov. 29, 2017, (5p).

(Continued)

*Primary Examiner* — Yu-Wen Chang
(74) *Attorney, Agent, or Firm* — Arch & Lake LLP

(57) ABSTRACT

Provided are a method for data transmission and apparatus. The method includes: receiving configuration information from a base station, the configuration information indicating whether a data packet deletion function is enabled at a PDCP entity corresponding to a preset data bearer. When the data packet deletion function is enabled, a duration for transmission of SDUs is recorded when the SDUs are transmitted from the PDCP entity corresponding to the preset data bearer to a RLC layer. A first SDU that has not yet been transmitted to the RLC layer is determined from the SDUs in a case that the duration for transmission of the SDUs is longer than a preset duration. The first SDU is deleted.

8 Claims, 13 Drawing Sheets

(56) References Cited

U.S. PATENT DOCUMENTS

| | | | | |
|---|---|---|---|---|
| 2010/0034187 | A1* | 2/2010 | Kumar | H04L 47/28 |
| | | | | 370/345 |
| 2014/0064219 | A1* | 3/2014 | Quan | H04W 72/1284 |
| | | | | 370/329 |
| 2014/0105112 | A1* | 4/2014 | Chun | H04L 1/1877 |
| | | | | 370/328 |
| 2016/0164793 | A1* | 6/2016 | Basu Mallick | H04W 28/08 |
| | | | | 370/235 |
| 2016/0345198 | A1* | 11/2016 | Lee | H04W 24/08 |
| 2016/0352643 | A1* | 12/2016 | Xiao | H04L 47/28 |
| 2018/0287748 | A1* | 10/2018 | Kim | H04L 47/30 |
| 2018/0302816 | A1* | 10/2018 | Yi | H04W 28/0263 |
| 2020/0153746 | A1* | 5/2020 | Jiang | H04L 47/32 |
| 2020/0154499 | A1* | 5/2020 | Futaki | H04W 8/22 |
| 2020/0367315 | A1* | 11/2020 | Gao | H04W 76/11 |
| 2021/0006644 | A1* | 1/2021 | Yang | H04L 69/28 |

OTHER PUBLICATIONS

Lenovo, Motorola Mobility—R2-1706887, PDCP Discard Timer for NR. 3GPP TSG-RAN WG2 Meeting NR#2, Qingdao P.R. China, Jun. 16, 2017, (2p).

First Office Action of the Chinese Application No. 201780000680.9, dated Nov. 2, 2020 with English translation, (15p).

Huawei, etc., "PDCP Discard Mechanism" 3GPP TSG-RAN WG2 NR Ad Hoc, R2-1706485, Qingdao, China Jun. 17, 2017, (2p).

* cited by examiner

METHOD AND APPARATUS FOR DATA TRANSMISSION, ELECTRONIC DEVICE AND COMPUTER READABLE STORAGE MEDIUM

CROSS-REFERENCE

This application is a continuation of PCT Application No. PCT/CN2017/094293, filed on Jul. 25, 2017 and named after "METHOD AND APPARATUS FOR DATA TRANSMISSION, ELECTRONIC DEVICE, AND COMPUTER READABLE STORAGE MEDIUM", the contents of which are hereby incorporated by reference in its entirety.

TECHNICAL FIELD

The present disclosure generally relates to the technical field of communications, and more particularly, to a method and apparatus for data transmission, an electronic device and a computer-readable storage medium.

BACKGROUND

At present, a function of discarding data packets (or called deletion) is introduced into a data process of 5th-Generation (5G) of the 3rd Generation Partnership Project (3GPP) to implement Active Queue Management (AQM).

For example, when Service Data Units (SDUs) are transmitted from a Packet Data Convergence Protocol (PDCP) entity to a Radio Link Control (RLC) layer, upon that when a certain SDU at the PDCP entity has not yet been transmitted to the RLC layer after a set time, the SDU and a Protocol Data Unit (PDU) associated therewith are deleted.

However, a PDU includes an SDU and a Sequence Number (SN), user equipment is required to determine information such as a transmission sequence according to the SN in a process of transmitting data to a base station, and the base station is also required to determine information such as a receiving sequence according to the SN. Discarding the SDU and the PDU may cause an SN gap, namely causing missing of part of the SN, and may further disorder or delay data transmission of the user equipment and data reception of the base station to a certain extent.

SUMMARY

According to a first aspect of the present disclosure, a method for data transmission is provided. The method may include: receiving configuration information sent by a base station, where the configuration information indicate whether a data packet deletion function is enabled or not at a PDCP entity corresponding to a preset data bearer; upon that when the data packet deletion function is enabled at the PDCP entity corresponding to the preset data bearer, when SDUs are transmitted from the PDCP entity corresponding to the preset data bearer to an RLC layer, a duration for transmission of the SDUs is recorded; a first SDU that has not yet been transmitted to the RLC layer in the SDUs in response to that the duration for transmission of the SDUs is longer than a preset duration is determined; and the first SDU is deleted.

According to second aspect of the embodiments of the present disclosure, an electronic device is provided. The electronic device may include: a processor; and a memory configured to store an instruction executable for the processor. The processor may be configured to: receive configuration information from a base station, the configuration information indicating whether a data packet deletion function is enabled or not at a PDCP entity corresponding to a preset data bearer; upon that when the data packet deletion function is enabled at the PDCP entity corresponding to the preset data bearer, when the PDCP entity corresponding to the preset data bearer transmits SDUs to an RLC layer, record a duration for transmission of the SDUs; determine from the SDUs a first SDU that has not yet been transmitted to the RLC layer in response to that the duration for transmission of the SDUs is longer than a preset duration; and delete the first SDU.

According to a third aspect of the embodiments of the present disclosure, a computer-readable storage medium is provided, in which a computer program may be stored, the program being executed by a processor to implement the following steps: configuration information sent by a base station is received, the configuration information indicating whether a data packet deletion function is enabled or not at a PDCP layer corresponding to a preset data bearer; upon that when the data packet deletion function is enabled at the PDCP layer corresponding to the preset data bearer, a duration for transmission of the SDUs is recorded when SDUs are transmitted from the PDCP layer corresponding to the preset data bearer to an RLC layer; a first SDU that has not yet been transmitted to the RLC layer in a case that the duration for transmission of the SDUs is longer than a preset duration is determined from the SDUs; and the first SDU is deleted.

It is to be understood that the above general descriptions and detailed descriptions below are only exemplary and explanatory and not intended to limit the present disclosure.

BRIEF DESCRIPTION OF THE DRAWINGS

In order to describe the technical solutions in the embodiments of the present application more clearly, the drawings to be used for descriptions about the embodiments will be simply introduced below. It is apparent that the drawings described below are only some embodiments of the present application. Those of ordinary skill in the art may further obtain other drawings based on these drawings without creative work.

DETAILED DESCRIPTION

The technical solutions in the embodiments of the present application will be clearly and completely described below in combination with the drawings in the embodiments of the present application. It is apparent that the described embodiments are not all embodiments but only part of embodiments of the present application. All other embodiments obtained by those of ordinary skill in the art based on the embodiments in the present application without creative work shall fall within the scope of protection of the present application.

A term used in an example herein is merely for describing the example instead of limiting the present disclosure. A singular form "a" and "the" used in an example herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that."

In addition, described characteristics, structures or features may be combined in one or more implementation modes in any proper manner. In the following descriptions, many details are provided to allow a full understanding of examples herein. However, those skilled in the art know that the technical solutions of examples herein may be carried out without one or more of the details; alternatively, another method, component, device, step, etc. may be adopted. Under other conditions, no detail of a known structure, method, device, implementation, material or operation may be shown or described to avoid obscuring aspects of examples herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

Figure 1:
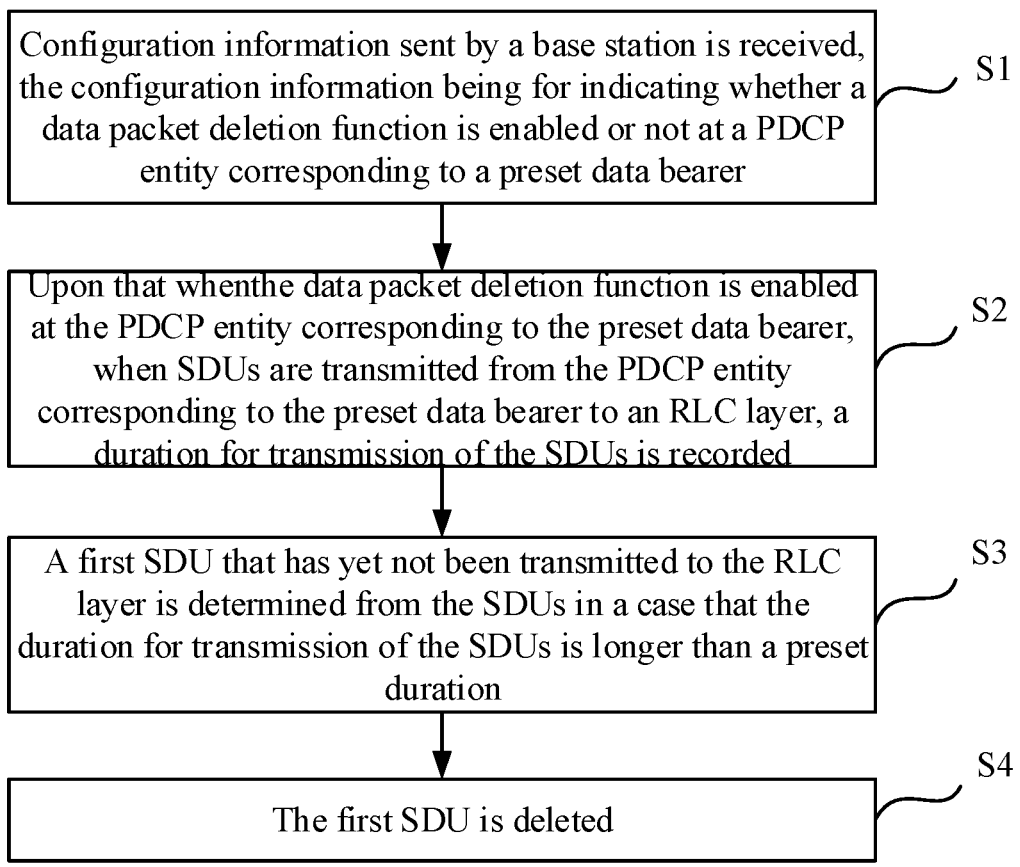
FIG. 1 is a schematic flow chart showing a method for data transmission, according to an aspect of the disclosure.

FIG. 1 is a schematic flow chart showing a method for data transmission, according to an aspect of the disclosure. As shown in FIG. 1, the method may be applied to user equipment. The user equipment may receive a 5G signal from a 5G base station. The user equipment may be an electronic device such as a mobile phone and a tablet computer. As shown in FIG. 1, the method for data transmission includes the following steps.

In the step S1, configuration information sent by a base station is received, the configuration information indicating whether a data packet deletion function is enabled or not at a PDCP entity corresponding to a preset data bearer.

In one or more embodiments, the base station may be configured to send a 5G signal, and the configuration information may be included in the 5G signal, and for example, may be included in system information of the 5G signal.

In one or more embodiments, the configuration information may be configured to indicate whether the data packet deletion function is enabled or not at the PDCP entity corresponding to the preset data bearer. Under the circumstance, the configuration information may include multiple bits, of which one bit is for representing whether the data packet deletion function is enabled or not, and other bits are for representing the indicated preset data bearer. The configuration information may also be configured to indicate whether the data packet deletion function is enabled or not at PDCP entities of all data bearers, and under the circumstance, the configuration information may include only one bit, and the bit is for indicating whether the data packet deletion function is enabled or not.

In the step S2, upon that when the data packet deletion function is enabled at the PDCP entity corresponding to the preset data bearer, a duration for transmission of SDUs is recorded when the SDUs are transmitted from the PDCP entity corresponding to the preset data bearer to an RLC layer.

In the step S3, a first SDU that has not yet been transmitted to the RLC layer in a case that the duration for transmission of the SDUs is longer than a preset duration is determined from the SDUs.

In the step S4, the first SDU is deleted.

In one or more embodiments, a PDU of the PDCP entity is generated according to an SDU of the PDCP entity and an SN. For example, upon that when an SN is determined as a header of a data packet and an SDU is determined as the another part of the data packet, the generated data packet is the PDU of the PDCP entity.

In the related art, deletion of a PDU from the PDCP entity may result in that the PDU, received by the RLC layer, of the PDCP entity does not include an SN corresponding to the deleted PDU of the PDCP entity, and furthermore, when data are transmitted from the RLC layer and other layers (for example, a Media Access Control (MAC) layer) to a receiver (for example, a base station), no SN is included in the transmitted data, thereby causing an SN gap.

In one or more embodiments, when a PDU sent by an upper layer (for example, a Radio Resource Control (RRC) layer, and according to different applicable services, the upper layer may also be other layers) is received at the PDCP entity corresponding to the preset bearer, the received PDU may be determined as an SDU of the PDCP entity, then a timer is set for the SDU. The timer starts timing when the SDU (which may specifically be a PDU generated by an SDU and an SN) is transmitted from the PDCP entity to a lower layer thereof, i.e., the RLC layer.

When a duration of the timer for a certain SDU is longer than a preset duration, the SDU (i.e., the first SDU) is deleted, so that AQM is implemented, namely the SDU exceeding the preset duration is not transmitted to the receiver anymore. Therefore, a maximum duration for data transmission is controlled, and a buffer for a queue of the data transmission is controlled not to be excessively large.

In addition, since a time window where the user equipment transmits data to the receiver each time is limited and data that can be transmitted in the time window is also limited, not too many PDUs (i.e., SDUs of the PDCP entity), for example, only one or two, can be transmitted from the upper layer of the PDCP entity to the PDCP entity actually each time, and thus not many PDUs of the PDCP entity are generated by the PDCP entity according to the SDUs of the PDCP entity. Accordingly, a PDU of the PDCP entity may be reserved on the basis of deletion of an SDU from the PDCP entity, and then the PDU of the PDCP entity may be transmitted to the RLC layer and transmitted to a receiver. Therefore, the SN gap may be avoided on the basis of implementing AQM to a certain extent, and the receiver may smoothly receive data.

Figure 2:
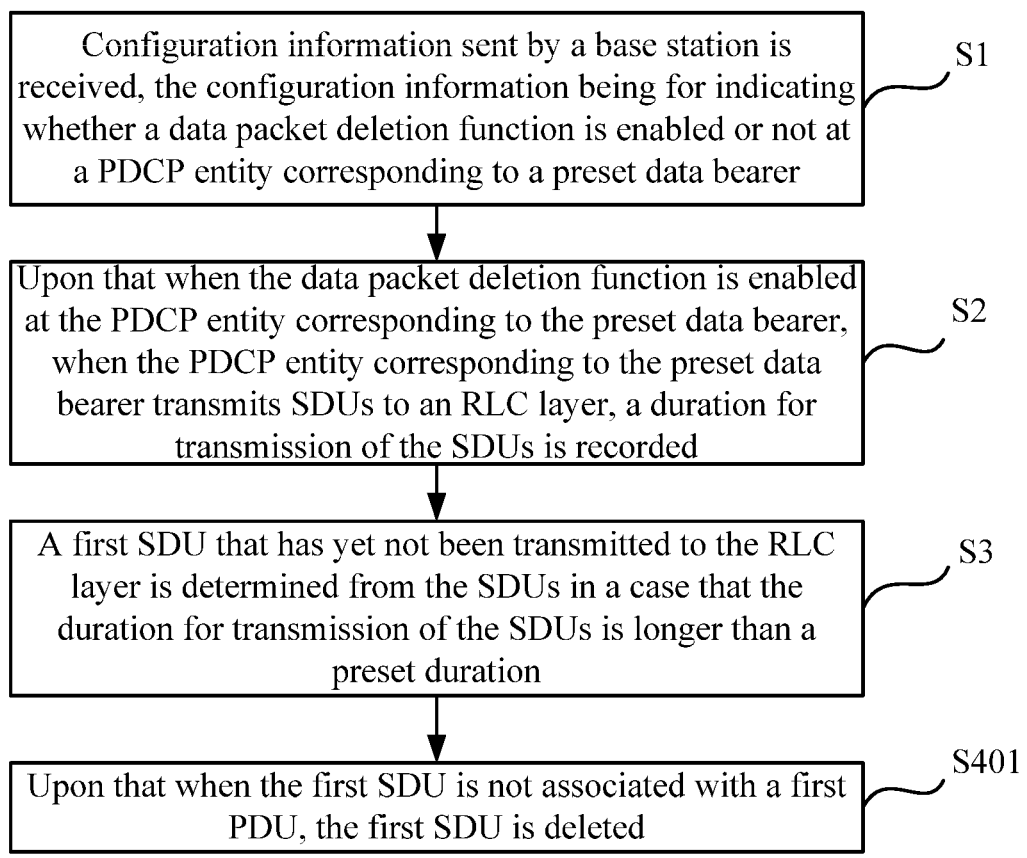
FIG. 2 is a schematic flow chart showing another method for data transmission, according to an aspect of the disclosure.

FIG. 2 is a schematic flow chart showing another method for data transmission, according to an aspect of the disclosure. As shown in FIG. 2, the operation that the first SDU is deleted includes the following operation.

In the step S401, upon that when the first SDU is not associated with a first PDU, the first SDU is deleted.

In one or more embodiments, the first SDU is not associated with the first PDU, namely the PDCP entity does not generate the first PDU according to the first SDU and an SN. Under the circumstance, since the first PDU associated with the first SDU is not generated, the PDCP entity may not transmit the first PDU to the RLC layer, and the RLC layer and another layer may not transmit the first PDU to the receiver. Therefore, the first SDU may be directly deleted without any SN gap or influence on the RLC layer.

Figure 3:
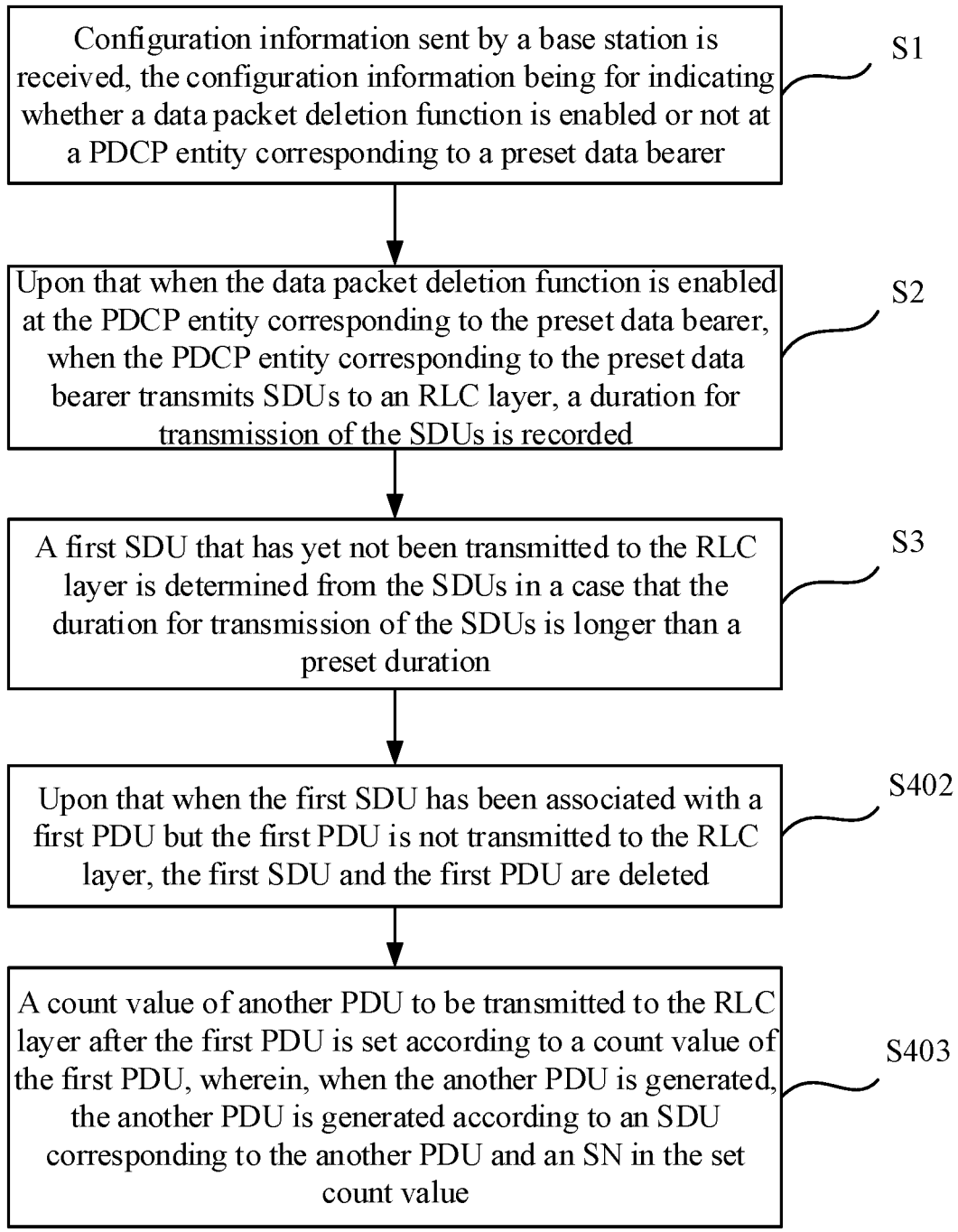
FIG. 3 is a schematic flow chart showing another method for data transmission, according to an aspect of the disclosure.

FIG. 3 is a schematic flow chart showing another method for data transmission, according to an aspect of the disclosure. As shown in FIG. 3, the operation that the first SDU is deleted includes the following operations.

In the step S402, upon that when the first SDU has been associated with the first PDU but the first PDU is not transmitted to the RLC layer, the first SDU and the first PDU are deleted.

In the step S403, a count value of another PDU, after the first PDU, to be transmitted to the RLC layer is set according to a count value of the first PDU.

The another PDU is generated according to an SDU corresponding to the another PDU and an SN in the set count value.

In one or more embodiments, the first SDU has been associated with the first PDU, namely the first PDU has been generated by the PDCP entity according to the first SDU and the SN. Under the circumstance, upon that when the PDCP entity has not yet transmitted the first PDU to the RLC layer, the RLC layer and another layer may not transmit the first PDU to the receiver. Therefore, the first PDU may be deleted without influence on the RLC layer. An adopted SN is 35 as an example, upon that when a next PDU is generated directly without setting according to a next SN 36, then the SN 35 misses.

On such a basis, a count value of another PDU to be transmitted to the RLC layer from the PDCP entity after the first PDU may be set according to the count value of the first PDU. A state variable Next_PDCP_Tx_Count including the count value may be set, where Count represents the count value, and the count value includes the SN (for example, the SN is represented by a plurality of lower bits of the count value).

The operation that the count value of the another PDU to be transmitted to the RLC layer after the first PDU is set according to the count value of the first PDU may be implemented by setting the count value of the first PDU as the count value of the another PDU, thereby making the SN corresponding to the another PDU the same as the SN of the first PDU. Furthermore, when the another PDU is generated, the another PDU may be generated according to the SDU corresponding to the another PDU and the SN in the set count value, and then the SN corresponding to the newly generated another PDU may be set to be the SN of the first PDU that is deleted, thereby avoiding the SN of the first PDU that is deleted missing. An SN corresponding to a subsequent PDU may also be set according to the SN corresponding to the newly generated another PDU. For example, the SN of the next PDU originally corresponding to the SN 36 may be set to be 35, thereby avoiding the SN 35 missing, and SNs of PDUs following the next PDU may be set according to the SN 35, for example, sequentially set to be 36, 37 and 38.

Figure 4:
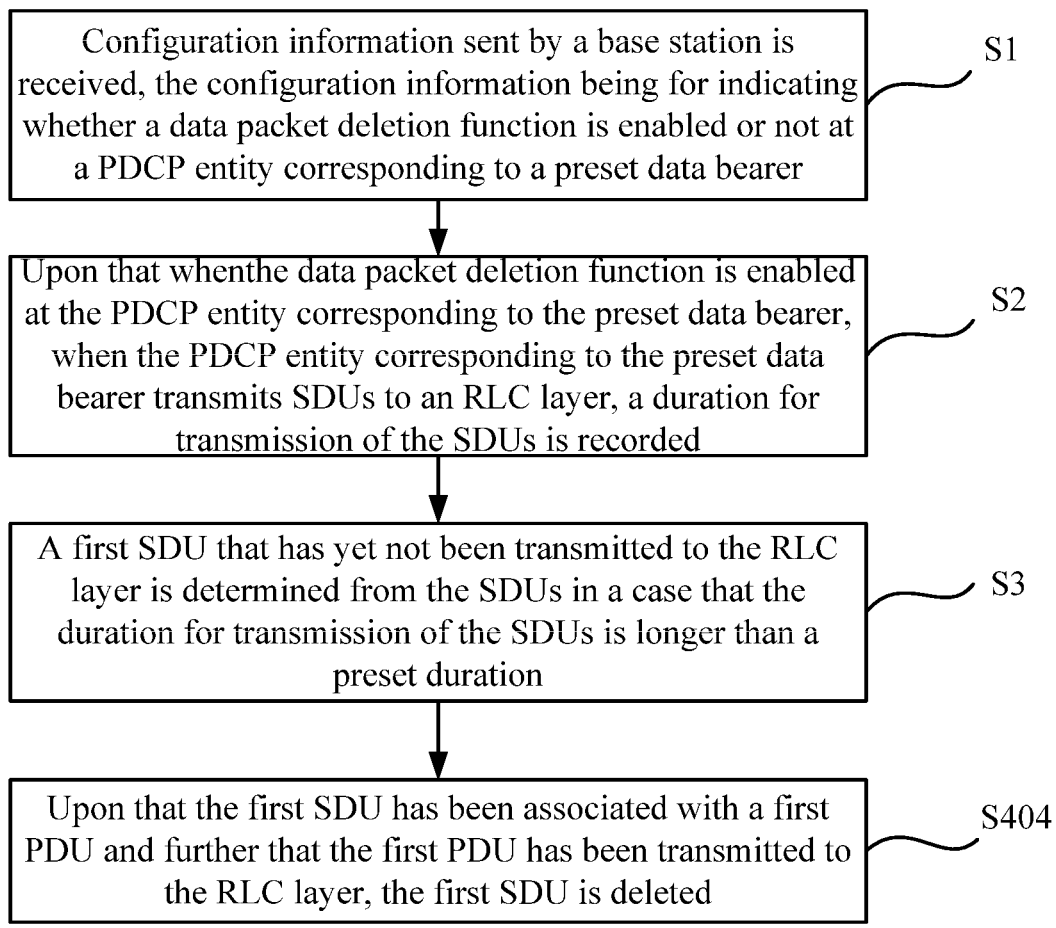
FIG. 4 is a schematic flow chart showing another method for data transmission, according to an aspect of the disclosure.

FIG. 4 is a schematic flow chart showing another method for data transmission, according to an aspect of the disclosure. As shown in FIG. 4, the operation that the first SDU is deleted includes the following operations.

In the step S404, upon that the first SDU has been associated with the first PDU and further that the first PDU has been transmitted to the RLC layer, the first SDU is deleted. In other words, the first SDU is deleted when both conditions are met: 1) the first SDU has been associated with the first PDU; and 2) the first PDU has been transmitted to the RLC layer.

In one or more embodiments, the first SDU has been associated with the first PDU, namely the first PDU has been generated at the PDCP entity according to the first SDU and the SN. Under the circumstance, upon that when the first PDU has been transmitted from the PDCP entity to the RLC layer, the first PDU may be transmitted from the RLC layer and another layer to the receiver, and deleting the first PDU may not only cause missing of the SN but also affect the RLC layer. Therefore, only the first SDU is deleted and the first PDU is reserved to avoid influence on the RLC layer and avoid missing of the SN.

Figure 5:
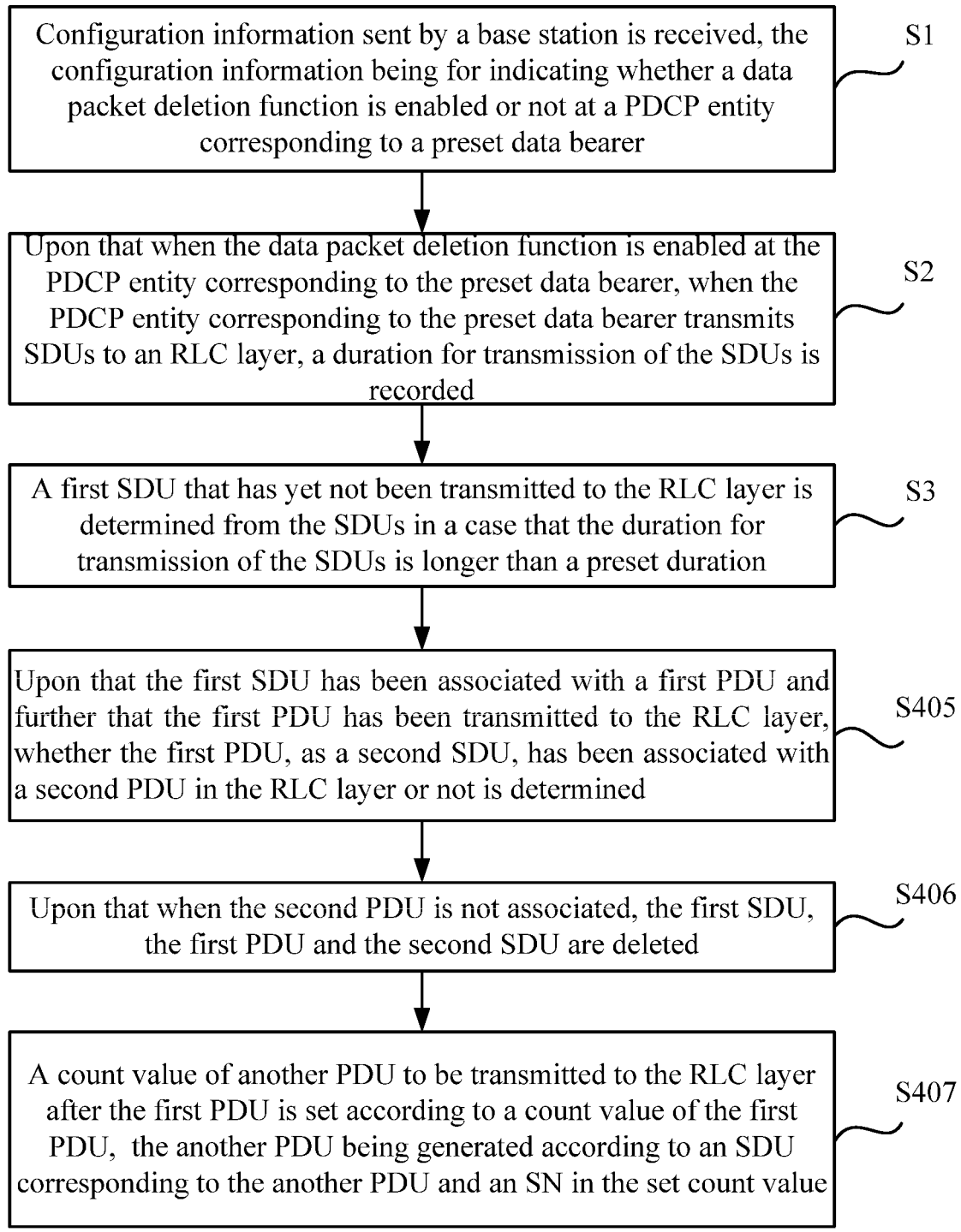
FIG. 5 is a schematic flow chart showing another method for data transmission, according to an aspect of the disclosure.

FIG. 5 is a schematic flow chart showing another method for data transmission, according to an aspect of the disclosure. As shown in FIG. 5, the operation that the first SDU is deleted includes the following operations.

In the step S405, upon that the first SDU has been associated with the first PDU and further that the first PDU has been transmitted to the RLC layer, whether the first PDU has been associated with a second PDU at the RLC layer as a second SDU or not is determined.

In the step S406, upon that when the second PDU is not associated, the first SDU, the first PDU and the second SDU are deleted.

In the step S407, the count value of another PDU to be transmitted to the RLC layer after the first PDU is set according to the count value of the first PDU.

The another PDU is generated according to the SDU corresponding to the another PDU and the SN in the set count value.

In one or more embodiments, the first SDU has been associated with the first PDU, namely the first PDU has been generated by the PDCP entity according to the first SDU and the SN, and the first PDU has been transmitted from the PDCP entity to the RLC layer. Under the circumstance, the RLC layer is usually required to further associate the first PDU with the second PDU by taking the first PDU as the second SDU and then transmit the second PDU to the receiver.

Upon that when the RLC layer does not associate the second SDU with the second PDU, the RLC layer and another layer may not subsequently transmit the second PDU to the receiver, so that deleting the first SDU and the first PDU may not bring influence to the RLC layer. Furthermore, the second SDU at the RLC layer may also be deleted, thereby maximally guaranteeing the implementation of AQM.

On such a basis, the count value of the another PDU to be transmitted to the RLC layer from the PDCP entity after the first PDU may be set according to the count value of the first PDU. For example, the same manner in the embodiment shown in FIG. 3 may be adopted, namely, the state variable Next_PDCP_Tx_Count including the count value is set, where Count represents the count value, and the count value includes the SN.

The operation that the count value of the another PDU to be transmitted to the RLC layer after the first PDU is set according to the count value of the first PDU may be implemented by setting the count value of the first PDU as the count value of the another PDU, thereby making the SN corresponding to the another PDU the same as the SN of the first PDU. Furthermore, at the moment of generating the another PDU, the another PDU may be generated according to the SDU corresponding to the another PDU and the SN in the set count value, and then the SN corresponding to the newly generated another PDU may be set to be the SN of the first PDU that is deleted, thereby avoiding the deleted SN of the first PDU missing. An SN corresponding to a subsequent PDU may also be set according to the SN corresponding to the newly generated another PDU.

Optionally, the configuration information is further for indicating whether a PDU deletion function is enabled or not at the PDCP entity corresponding to the preset data bearer.

In one or more embodiments, the configuration information may not only be configured to indicate whether the data packet deletion function is enabled or not at the PDCP entity corresponding to the preset data bearer but also be configured to indicate whether the PDU deletion function is enabled or not at the PDCP entity corresponding to the preset data bearer. Based on such an indication, upon that when the PDU deletion function is enabled at the PDCP entity corresponding to the preset data bearer, a PDU of the PDCP entity may be deleted, and upon that when the PDU deletion function is not enabled at the PDCP entity corresponding to the preset data bearer, only an SDU of the PDCP entity is deleted and the PDU is reserved.

Figure 6:
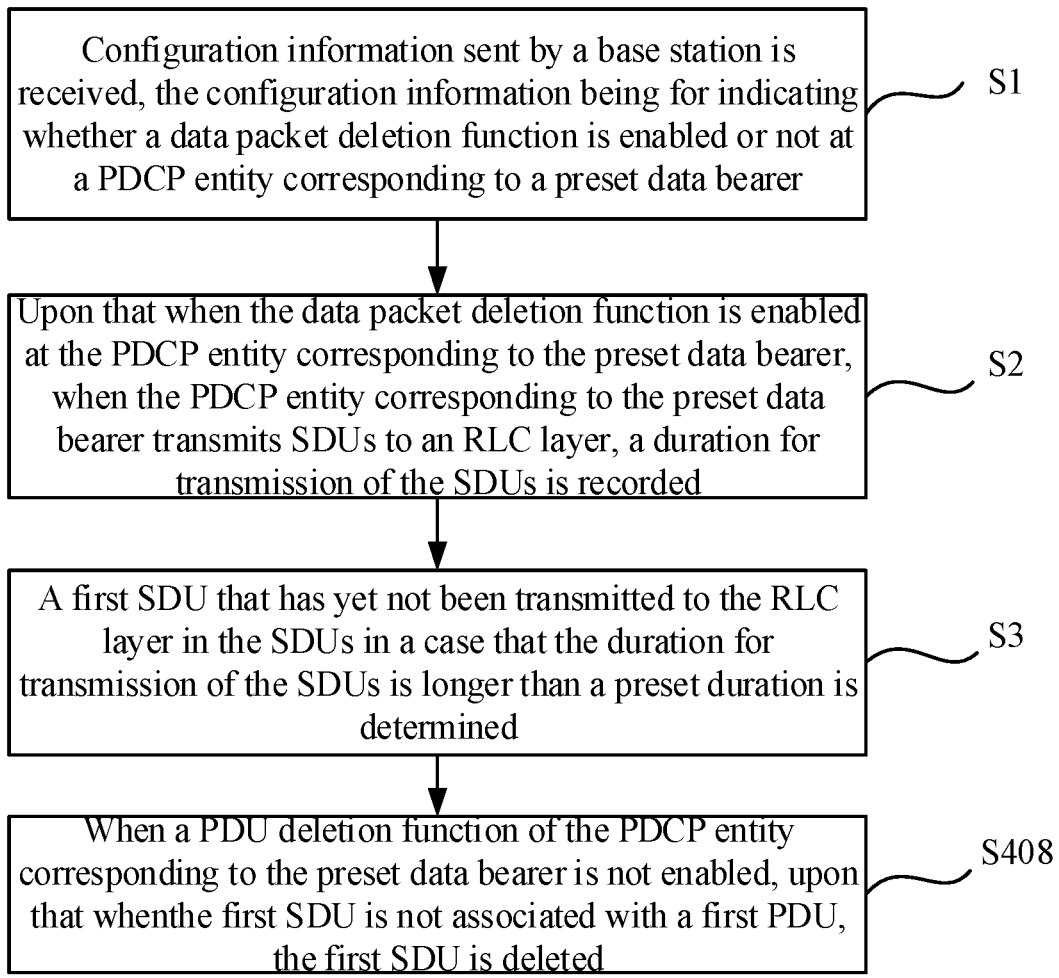
FIG. 6 is a schematic flow chart showing another method for data transmission, according to an aspect of the disclosure.

FIG. 6 is a schematic flow chart showing another method for data transmission, according to an aspect of the disclosure. As shown in FIG. 6, the operation that the first SDU is deleted includes the following operation.

In the step S408, when the PDU deletion function is not enabled at the PDCP entity corresponding to the preset data bearer, upon that when the first SDU is not associated with the first PDU, the first SDU is deleted.

In one or more embodiments, upon that when the PDU deletion function is not enabled at the PDCP entity corresponding to the preset data bearer, the PDU is required to be reserved. Under the circumstance, upon that when the first SDU is not associated with the first PDU, namely the PDCP entity does not generate the first PDU according to the first SDU and the SN, since the first PDU associated with the first SDU is not generated, the PDCP entity may not transmit the first PDU to the RLC layer, and the RLC layer and the another layer may not transmit the first PDU to the receiver. Therefore, the first SDU may be directly deleted without any SN gap and influence on the RLC layer.

Figure 7:
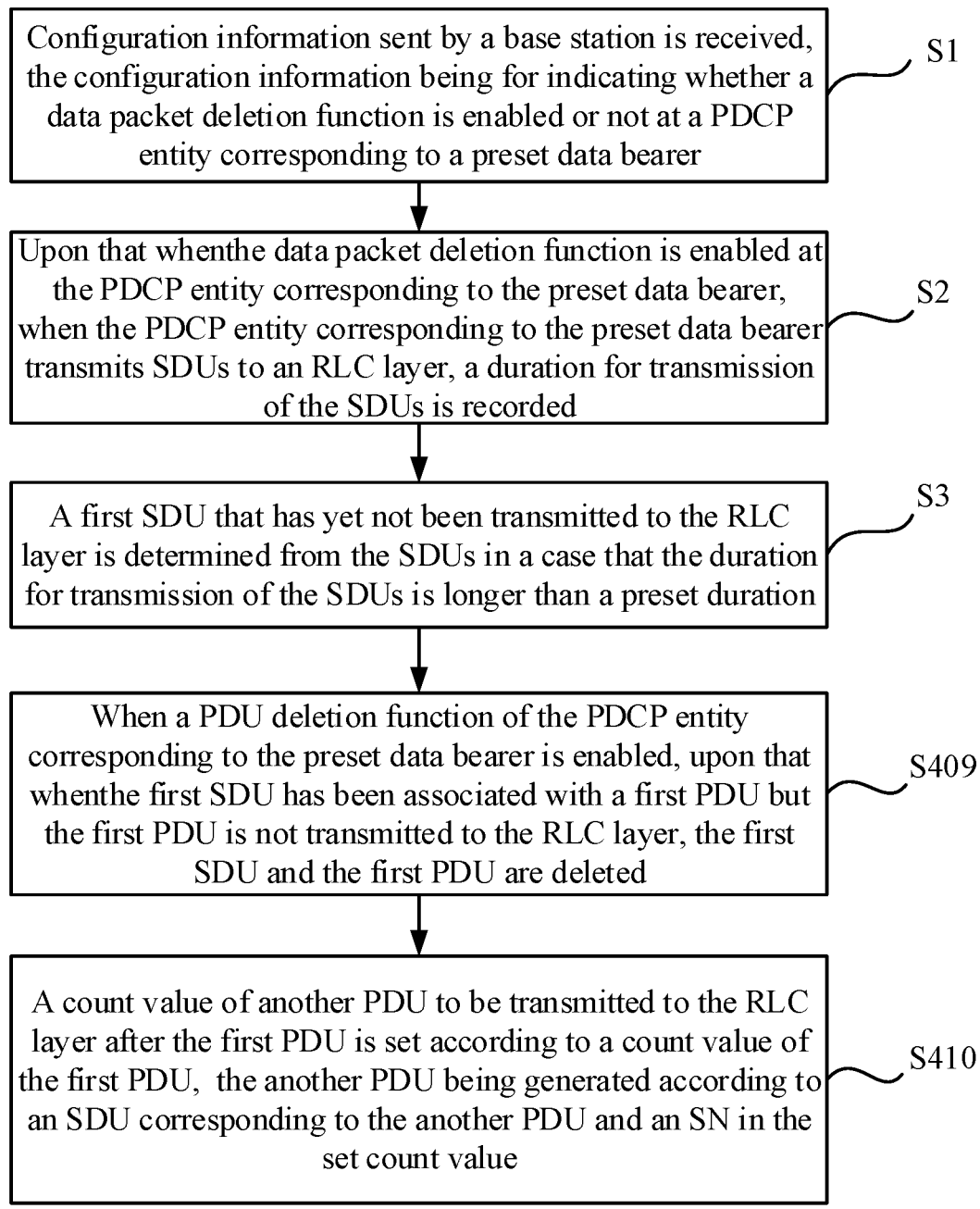
FIG. 7 is a schematic flow chart showing another method for data transmission, according to an aspect of the disclosure.

FIG. 7 is a schematic flow chart showing another method for data transmission, according to an aspect of the disclosure. As shown in FIG. 7, the operation that the first SDU is deleted includes the following operations.

In the step S409, when the PDU deletion function is enabled at the PDCP entity corresponding to the preset data bearer, upon that when the first SDU has been associated with the first PDU but the first PDU is not transmitted to the RLC layer, the first SDU and the first PDU are deleted.

In the step S410, the count value of another PDU to be transmitted to the RLC layer after the first PDU is set according to the count value of the first PDU.

The another PDU is generated according to the SDU corresponding to the another PDU and the SN in the set count value.

In one or more embodiments, upon that when the PDU deletion function is enabled at the PDCP entity corresponding to the preset data bearer, the PDU may be deleted. Under the circumstance, upon that when the first SDU has been associated with the first PDU, namely the first PDU has been generated by the PDCP entity according to the first SDU and the SN but the first PDU is not transmitted to the RLC layer, the first PDU may not be transmitted by the RLC layer and the another layer to the receiver either. Therefore, the first PDU may be deleted without influence on the RLC layer.

On such a basis, the same manner in the embodiment shown in FIG. 3 may be adopted, namely the count value of the another PDU to be transmitted to the RLC layer from the PDCP entity after the first PDU is set according to the count value of the first PDU. For example, the state variable Next_PDCP_Tx_Count including the count value may be set, where Count represents the count value, and the count value includes the SN.

The operation that the count value of the another PDU to be transmitted to the RLC layer after the first PDU is set according to the count value of the first PDU may be implemented by setting the count value of the first PDU as the count value of the another PDU, thereby making the SN corresponding to the another PDU the same as the SN of the first PDU. Furthermore, when the another PDU is generated, the another PDU may be generated according to the SDU corresponding to the another PDU and the SN in the set count value, and then the SN corresponding to the newly generated another PDU may be set to be the deleted SN of the first PDU, thereby avoiding the deleted SN of the first PDU from being missed. An SN corresponding to a subsequent PDU may also be set according to the SN corresponding to the newly generated another PDU.

Figure 8:
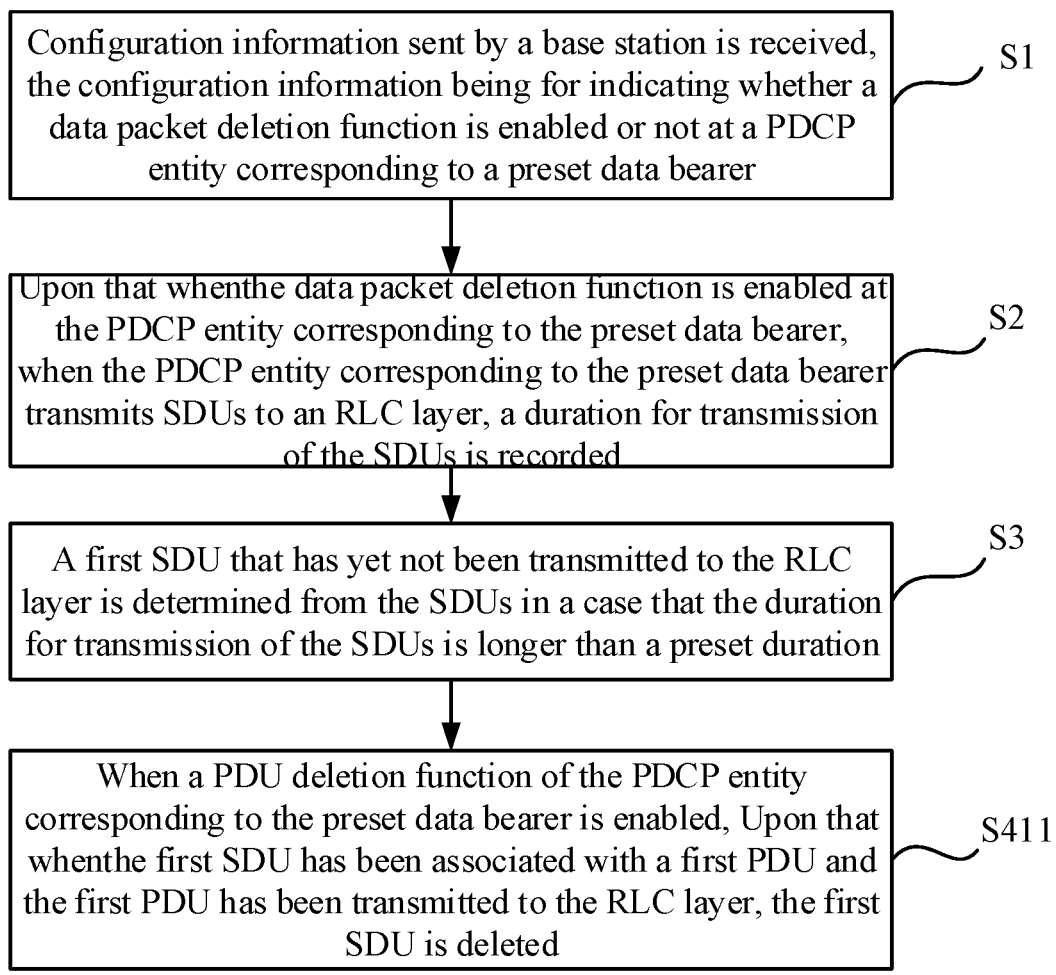
FIG. 8 is a schematic flow chart showing another method for data transmission, according to an aspect of the disclosure.

FIG. 8 is a schematic flow chart showing another method for data transmission, according to an aspect of the disclosure. As shown in FIG. 8, the operation that the first SDU is deleted includes the following operation.

In the step S411, when the PDU deletion function is enabled at the PDCP entity corresponding to the preset data bearer, upon that the first SDU has been associated with the first PDU and further that the first PDU has been transmitted to the RLC layer, the first SDU is deleted.

In one or more embodiments, upon that when the PDU deletion function is enabled at the PDCP entity corresponding to the preset data bearer, the PDU may be deleted. Under the circumstance, upon that when the first SDU has been associated with the first PDU, namely the first PDU has been generated by the PDCP entity according to the first SDU and the SN, and the first PDU has been transmitted from the PDCP entity to the RLC layer, the first PDU may not be transmitted by the RLC layer and the another layer to the receiver. Deleting the first PDU may not only cause missing of the SN but also bring influence to the RLC layer. Therefore, only the first SDU is deleted and the first PDU is reserved to avoid influence on the RLC layer and avoid missing of the SN. Therefore, only the first SDU is deleted and the first PDU is reserved to avoid influence on the RLC layer and avoid missing of the SN.

Figure 9:
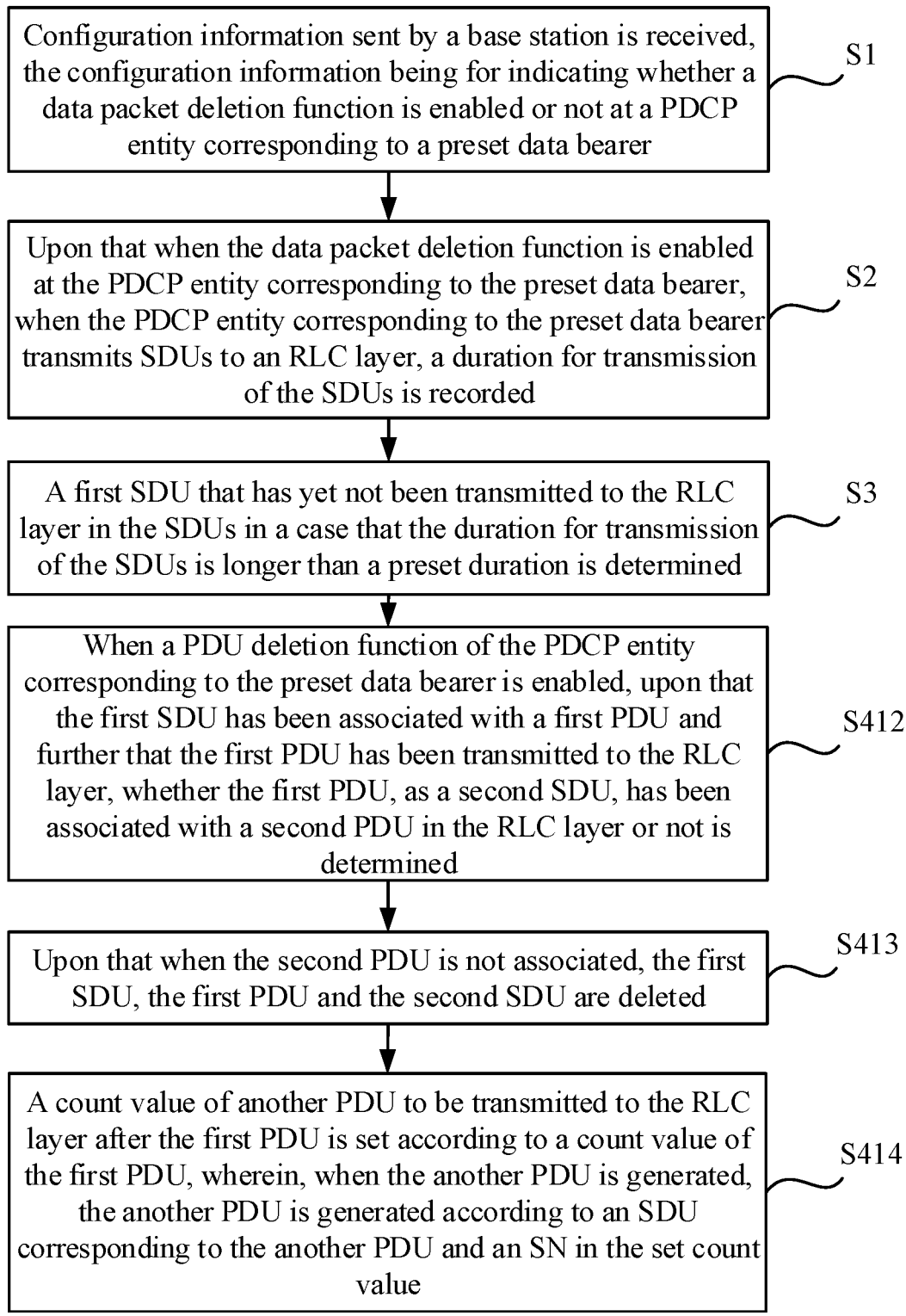
FIG. 9 is a schematic flow chart showing yet another method for data transmission, according to an aspect of the disclosure.

FIG. 9 is a schematic flow chart showing yet another method for data transmission, according to an aspect of the disclosure. As shown in FIG. 9, the operation that the first SDU is deleted includes the following operations.

In the step S412, when the PDU deletion function is enabled at the PDCP entity corresponding to the preset data bearer, upon that the first SDU has been associated with the first PDU and further that the first PDU has been transmitted to the RLC layer, whether the first PDU taken as the second SDU has been associated with the second PDU in the RLC layer or not is determined.

In the step S413, upon that when the second PDU is not associated, the first SDU, the first PDU and the second SDU are deleted.

In the step S414, the count value of another PDU to be transmitted to the RLC layer after the first PDU is set according to the count value of the first PDU.

The another PDU is generated according to the SN in the set count value and based on the SDU corresponding to the another PDU.

In one or more embodiments, upon that when the PDU deletion function is enabled at the PDCP entity corresponding to the preset data bearer, the PDU may be deleted. Under the circumstance, upon that when the first SDU has been associated with the first PDU, namely the first PDU has been generated by the PDCP entity according to the first SDU and the SN and the first PDU has been transmitted from the PDCP entity to the RLC layer, then the second PDU may not be subsequently transmitted from the RLC layer and the another layer may not to the receiver upon that when the RLC layer does not associate the second SDU with the second PDU, since the RLC layer usually needs to associate the first PDU as the second SDU with the second PDU and then transmit the second PDU to the receiver. Accordingly, deleting the first SDU and the first PDU may not bring influence to the RLC layer. Furthermore, the second SDU in the RLC layer may also be deleted, thereby maximally guaranteeing the implementation of AQM.

On such a basis, the count value of the another PDU to be transmitted to the RLC layer from the PDCP entity after the first PDU may be set according to the count value of the first PDU. For example, the same manner in the embodiment shown in FIG. 3 may be adopted namely, the state variable Next_PDCP_Tx_Count including the count value is set, where Count represents the count value, and the count value includes the SN.

The operation that the count value of the another PDU to be transmitted to the RLC layer after the first PDU is set according to the count value of the first PDU may be implemented by setting the count value of the first PDU as the count value of the another PDU, thereby making the SN corresponding to the another PDU the same as the SN of the first PDU. Furthermore, when the another PDU is generated, the another PDU may be generated according to the SDU corresponding to the another PDU and the SN in the set count value, and then the SN corresponding to the newly generated another PDU may be set to be the deleted SN of the first PDU, thereby avoiding the deleted SN of the first PDU from being missed. An SN corresponding to a subsequent PDU may also be set according to the SN corresponding to the newly generated another PDU.

Figure 10:
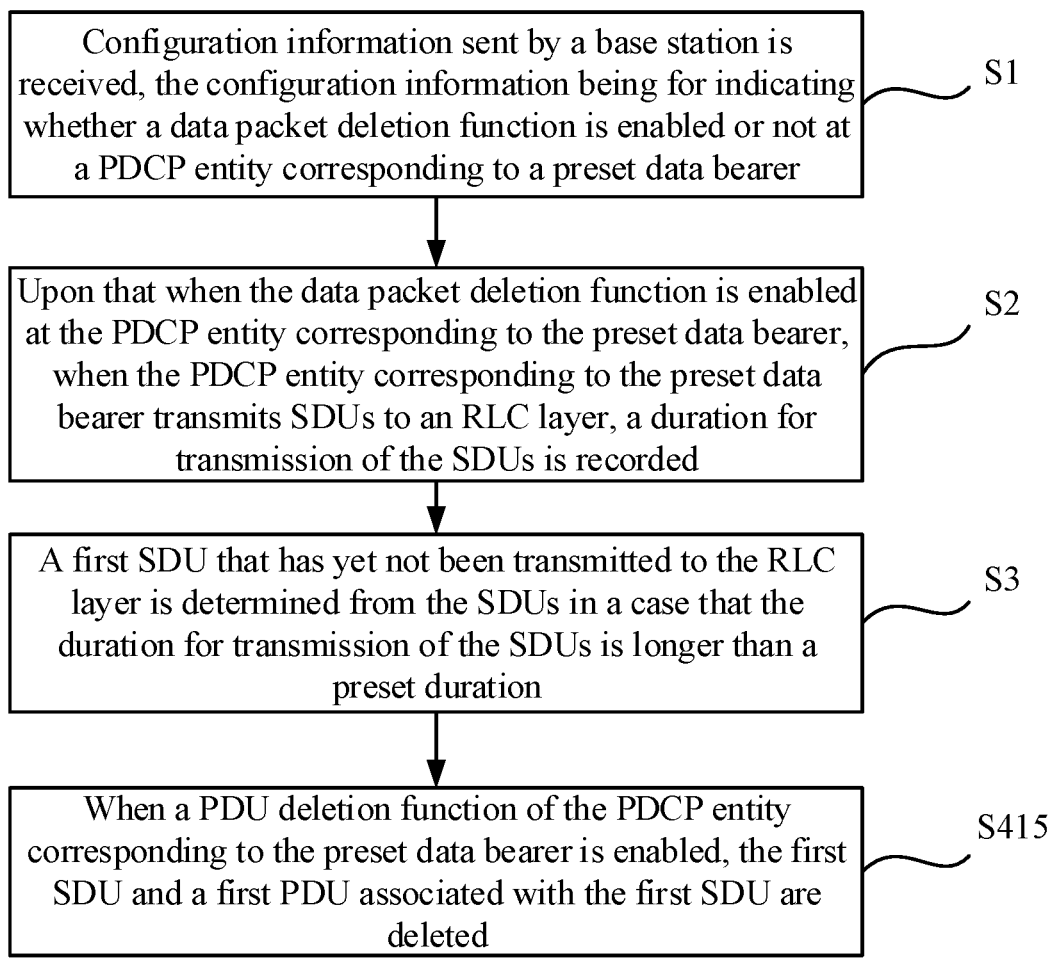
FIG. 10 is a schematic flow chart showing still another method for data transmission, according to an aspect of the disclosure.

FIG. 10 is a schematic flow chart showing still another method for data transmission, according to an aspect of the disclosure. As shown in FIG. 10, the operation that the first SDU is deleted includes the following operation.

In the step S415, when the PDU deletion function is enabled at the PDCP entity corresponding to the preset data bearer, the first SDU and the first PDU associated with the first SDU are deleted.

In one or more embodiments, under the circumstance that the PDU deletion function is enabled at the PDCP entity corresponding to the preset data bearer, it is unnecessary to further determine whether the first SDU is associated with the first PDU or not and whether the first SDU is transmitted to the RLC layer or not, or when the RLC layer associates the second SDU, the first SDU and the first PDU associated with the first SDU may be directly deleted, thereby guaranteeing the maximal implementation of AQM.

The embodiment shown in FIG. 10 is different from the embodiments shown in FIG. 7 to FIG. 9, and in a specific application process, the corresponding implementation mode may be selected according to a requirement.

Corresponding to the embodiments of the method for data transmission, the present disclosure also provides embodiments of an apparatus for data transmission.

Figure 11:
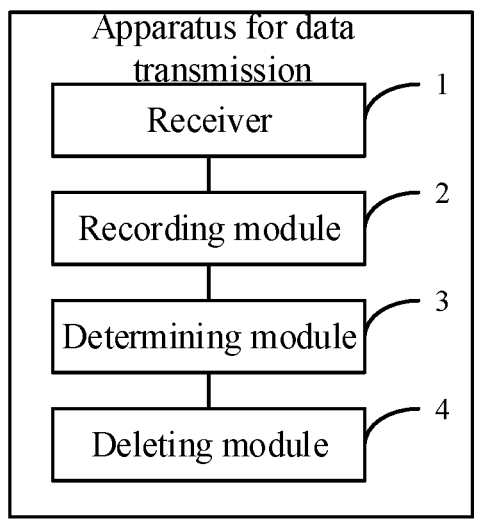
FIG. 11 is a schematic block diagram of an apparatus for data transmission, according to an aspect of the disclosure.

FIG. 11 is a schematic block diagram of an apparatus for data transmission, according to an aspect of the disclosure. As shown in FIG. 11, the apparatus for data transmission includes:

a receiver 1, configured to receive configuration information from a base station, the configuration information indicating whether a data packet deletion function is enabled or not at a PDCP entity corresponding to a preset data bearer;

a recording module 2, configured to, upon that when the data packet deletion function is enabled at the PDCP entity corresponding to the preset data bearer, when the PDCP entity corresponding to the preset data bearer transmits SDUs to an RLC layer, record a duration for transmission of the SDUs;

a determining module 3, configured to determine from the SDUs a first SDU that has not yet been transmitted to the RLC layer in a case that the duration for transmission of the SDUs is longer than a preset duration; and a deleting module 4, configured to delete the first SDU.

Optionally, the deleting module is configured to, when the first SDU is not associated with a first PDU, delete the first SDU.

Figure 12:
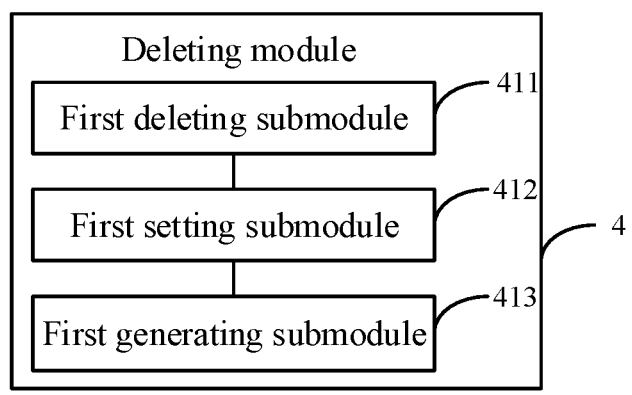
FIG. 12 is a schematic block diagram of a deleting module, according to an aspect of the disclosure.

FIG. 12 is a schematic block diagram of a deleting module, according to an aspect of the disclosure. As shown in FIG. 12, the deleting module includes:

a first deleting submodule 411, configured to, when the first SDU has been associated with the first PDU but the first PDU is not transmitted to the RLC layer, delete the first SDU and the first PDU;

a first setting submodule 412, configured to set a count value of another PDU, after the first PDU, to be transmitted to the RLC layer according to a count value of the first PDU; and a first generating submodule 413, configured to, when the another PDU is generated, generate the another PDU according to an SDU corresponding to the another PDU and an SN in the set count value.

Optionally, the deleting module is configured to delete the first SDU when the first SDU has been associated with the first PDU and the first PDU has been transmitted to the RLC layer.

Figure 13:
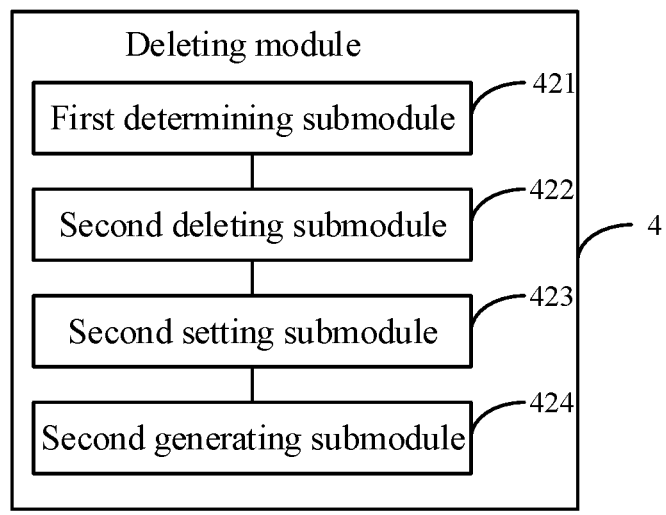
FIG. 13 is a schematic block diagram of another deleting module, according to an aspect of the disclosure.

FIG. 13 is a schematic block diagram of another deleting module, according to an aspect of the disclosure. As shown in FIG. 13, the deleting module includes:

a first determining submodule 421, configured to, when the first SDU has been associated with the first PDU and the first PDU has been transmitted to the RLC layer, determine whether the first PDU, as a second SDU, has been associated with a second PDU in the RLC layer or not;

a second deleting submodule 422, configured to delete the first SDU, the first PDU and the second SDU, when the second SDU is not associated with the second PDU;

a second setting submodule 423, configured to set the count value of the another PDU to be transmitted to the RLC layer after the first PDU according to the count value of the first PDU; and a second generating submodule 424, configured to, when the another PDU is generated, generate the another PDU according to the SDU corresponding to the another PDU and the SN in the set count value.

Optionally, the configuration information is further configured to indicate whether a PDU deletion function is enabled or not at the PDCP entity corresponding to the preset data bearer.

Optionally, the deleting module is configured to delete the first SDU upon that when the first SDU is not associated with the first PDU, when the PDU deletion function is not enabled at the PDCP entity corresponding to the preset data bearer.

Figure 14:
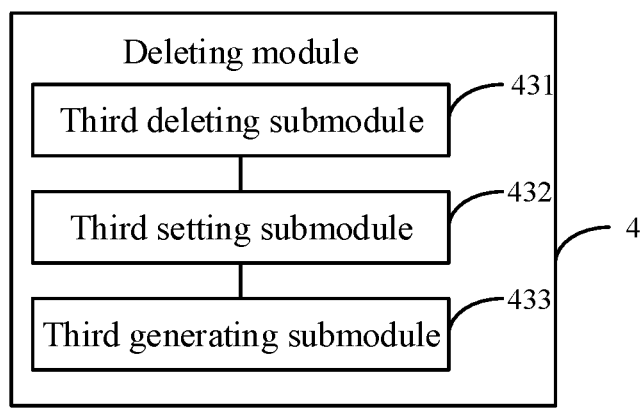
FIG. 14 is a schematic block diagram of yet another deleting module, according to an aspect of the disclosure.

FIG. 14 is a schematic block diagram of yet another deleting module, according to an aspect of the disclosure. As shown in FIG. 14, the deleting module includes:

a third deleting submodule 431, configured to delete the first SDU and the first PDU upon that when the first SDU has been associated with the first PDU but the first PDU is not transmitted to the RLC layer, when the PDU deletion function is enabled at the PDCP entity corresponding to the preset data bearer;

a third setting submodule 432, configured to set the count value of the another PDU to be transmitted to the RLC layer after the first PDU according to the count value of the first PDU; and a third generating submodule 433, configured to, when the another PDU is generated, generate the another PDU according to the SDU corresponding to the another PDU and the SN in the set count value.

Optionally, the deleting module is configured to delete the first SDU upon that the first SDU has been associated with the first PDU and further that the first PDU has been transmitted to the RLC layer, when the PDU deletion function is enabled at the PDCP entity corresponding to the preset data bearer.

Figure 15:
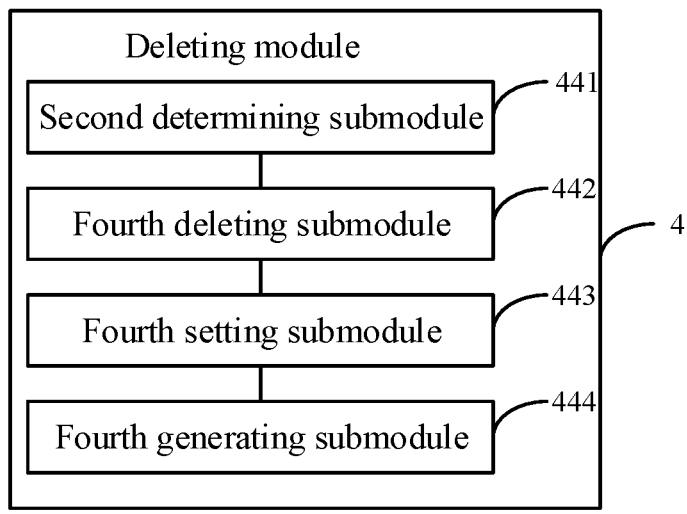
FIG. 15 is a schematic block diagram of still another deleting module, according to an aspect of the disclosure.

FIG. 15 is a schematic block diagram of still another deleting module, according to an aspect of the disclosure. As shown in FIG. 15, the deleting module includes:

a second determining submodule 441, configured to determine whether the first PDU taken as the second SDU has been associated with the second PDU in the RLC layer or not upon that the first SDU has been associated with the first PDU and further that the first PDU has been transmitted to the RLC layer, when the PDU deletion function is enabled at the PDCP entity corresponding to the preset data bearer. Here, it is determined that first PDU taken as the second SDU has been associated with the second PDU in the RLC layer when both conditions are met: 1) the first SDU has been associated with the first PDU; and 2) the first PDU has been transmitted to the RLC layer.

a fourth deleting submodule 442, configured to delete the first SDU, the first PDU and the second SDU, when the second SDU is not associated with the second PDU;

a fourth setting submodule 443, configured to set the count value of the another PDU to be transmitted to the RLC layer after the first PDU according to the count value of the first PDU; and a fourth generating submodule 444, configured to, when the another PDU is generated, generate the another PDU according to the SDU corresponding to the another PDU and the SN in the set count value.

Optionally, the deleting module is configured to, when the PDU deletion function is enabled at the PDCP entity corresponding to the preset data bearer, delete the first SDU and the first PDU associated with the first SDU.

With respect to the apparatuses in the above embodiments, the specific manners for performing operations for individual modules therein have been described in detail in the embodiments regarding the methods, which will not be elaborated herein.

The apparatus embodiments substantially correspond to the method embodiments, and thus related parts refer to part of descriptions of the method embodiments. The apparatus embodiments described above are only schematic ones. The modules described as separate parts therein may or may not be physically separated, and parts displayed as modules may or may not be physical modules, which namely may be located in the same place or distributed to multiple network modules. Part or all of the modules therein may be selected according to a practical requirement to achieve the purpose of the solutions of the present disclosure. Those of ordinary skill in the art may understand and implement without creative work.

Correspondingly, the present disclosure also provides an electronic device, which includes: a processor; and a memory configured to store an instruction executable for the processor. The processor is configured to:

receive configuration information from a base station, the configuration information indicating whether a data packet deletion function is enabled or not at a PDCP entity corresponding to a preset data bearer;

upon that when the data packet deletion function is enabled at the PDCP entity corresponding to the preset data bearer, record a duration for transmission of the SDUs in response to that SDUs are transmitted by the PDCP entity corresponding to the preset data bearer to an RLC layer;

determine a first SDU that has not yet been transmitted to the RLC layer in the SDUs in a case that the duration for transmission of the SDUs is longer than a preset duration; and delete the first SDU.

Correspondingly, the present disclosure also provides a terminal, which includes a memory and one or more than one program. The one or more than one program is stored in the memory and configured to be executed by one or more than one processor. The one or more than one program includes instructions for executing the following operations:

configuration information sent by a base station is received, the configuration information indicating whether a data packet deletion function is enabled or not at a PDCP entity corresponding to a preset data bearer;

upon that when the data packet deletion function is enabled at the PDCP entity corresponding to the preset data bearer, a duration for transmission of the SDUs is recorded in response to that SDUs are transmitted from the PDCP entity corresponding to the preset data bearer to an RLC layer;

a first SDU that has not yet been transmitted to the RLC layer is determined from the SDUs in response to that the duration for transmission of the SDUs is longer than a preset duration; and the first SDU is deleted.

Correspondingly, the present disclosure further provides a computer-readable storage medium, in which a computer program is stored, the program being executed by a processor to implement the following steps:

configuration information sent by a base station is received, the configuration information indicating whether a data packet deletion function is enabled or not at a PDCP entity corresponding to a preset data bearer;

upon that when the data packet deletion function is enabled at the PDCP entity corresponding to the preset data bearer, a duration for transmission of the SDUs is recorded when the PDCP entity corresponding to the preset data bearer transmits SDUs to an RLC layer;

a first SDU that has not yet been transmitted to the RLC layer is determined from the SDUs in a case that the duration for transmission of the SDUs is longer than a preset duration;

and the first SDU is deleted.

Figure 16:
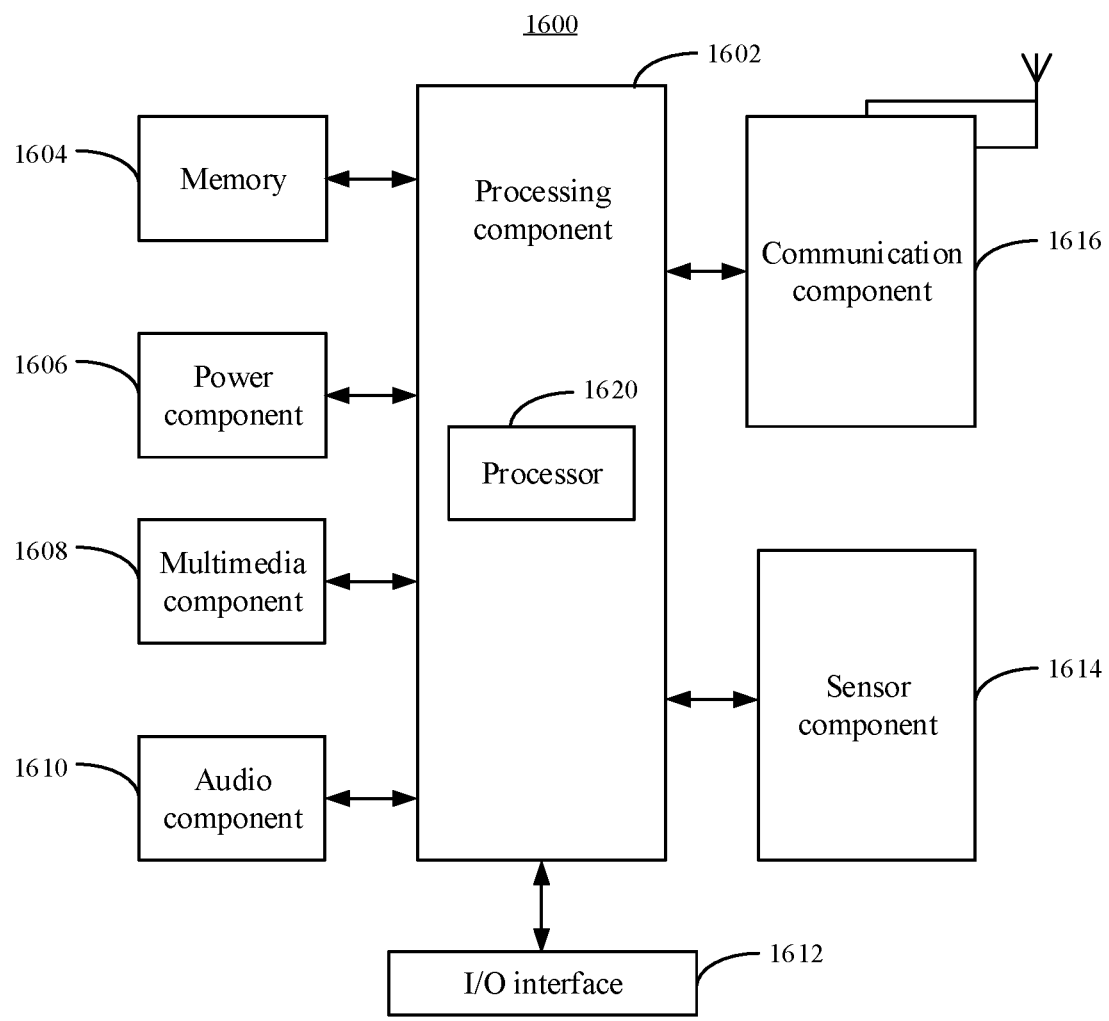
FIG. 16 is a schematic block diagram of an apparatus for data transmission, according to an aspect of the disclosure.

FIG. 16 is a schematic block diagram of an apparatus for data transmission 1600, according to an aspect of the disclosure. For example, the apparatus 1600 may be a mobile phone, a computer, a digital broadcast terminal, a messaging device, a gaming console, a tablet, a medical device, exercise equipment, a personal digital assistant and the like.

Referring to FIG. 16, the apparatus 1600 may include one or more of the following components: a processing component 1602, a memory 1604, a power component 1606, a multimedia component 1608, an audio component 1610, an Input/Output (I/O) interface 1612, a sensor component 1614, and a communication component 1616.

The processing component 1602 may typically control overall operations of the apparatus 1600, such as the operations associated with display, telephone calls, data communications, camera operations, and recording operations. The processing component 1602 may include one or more processors 1620 to execute instructions to perform all or part of the steps in the abovementioned method. Moreover, the processing component 1602 may include one or more modules which facilitate interaction between the processing component 1602 and the other components. For instance, the processing component 1602 may include a multimedia module to facilitate interaction between the multimedia component 1608 and the processing component 1602.

The memory 1604 is configured to store various types of data to support the operation of the apparatus 1600. Examples of such data include instructions for any application programs or methods operated on the apparatus 1600, contact data, phonebook data, messages, pictures, video, etc. The memory 1604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1606 may provide power for various components of the apparatus 1600. The power component 1606 may include a power management system, one or more power supplies, and other components associated with generation, management and distribution of power for the apparatus 1600.

The multimedia component 1608 may include a screen for providing an output interface between the apparatus 1600 and a user. In some embodiments, the screen may include a Liquid Crystal Display (LCD) and a Touch Panel (TP). Upon that when the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1608 may include a front camera and/or a rear camera. The front camera and/or the rear camera may receive external multimedia data when the apparatus 1600 is in an operation mode, such as a photographing mode or a video mode. Each of the front camera and the rear camera may be a fixed optical lens system or have capabilities of focusing and optical zooming.

The audio component 1610 is configured to output and/or input an audio signal. For example, the audio component 1610 includes a Microphone (MIC), and the MIC is configured to receive an external audio signal when the apparatus 1600 is in the operation mode, such as a call mode, a recording mode and a voice recognition mode. The received audio signal may further be stored in the memory 1604 or sent through the communication component 1616. In some embodiments, the audio component 1610 further includes a speaker configured to output the audio signal.

The I/O interface 1612 may provide an interface between the processing component 1602 and a peripheral interface module, and the peripheral interface module may be a keyboard, a click wheel, a button and the like. The button may include, but not limited to: a home button, a volume button, a starting button and a locking button.

The sensor component 1614 may include one or more sensors configured to provide the apparatus 1600 with status assessment in various aspects. For instance, the sensor component 1614 may detect an on/off status of the apparatus 1600 and relative positioning of components, such as a display and small keyboard of the apparatus 1600, and the sensor component 1614 may further detect a change in a position of the apparatus 1600 or a component of the apparatus 1600, presence or absence of contact between the user and the apparatus 1600, orientation or acceleration/deceleration of the apparatus 1600 and a change in temperature of the apparatus 1600. The sensor component 1614 may include a proximity sensor configured to detect presence of an object nearby without any physical contact. The sensor component 1614 may also include a light sensor, such as a Complementary Metal Oxide Semiconductor (CMOS) or Charge Coupled Device (CCD) image sensor, configured for use in an imaging application. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the apparatus 1600 and other equipment. The apparatus 1600 may access a communication-standard-based wireless network, such as a Wireless Fidelity (WiFi) network, a 2nd-Generation (2G) or 3rd-Generation (3G) network or a combination thereof. In an aspect of the disclosure, the communication component 1616 receives a broadcast signal or broadcast associated information from an external broadcast management system through a broadcast channel. In one or more embodiments, the communication component 1616 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a BT technology and another technology.

In one or more embodiments, the apparatus 1600 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method. The apparatus 1600 may use the circuitries in combination with the other hardware or software components for performing the above described methods. Each module, sub-module, unit, or sub-unit in the disclosure may be implemented at least partially using the one or more circuitries.

In one or more exemplary embodiments, there is also provided a non-transitory computer-readable storage medium including an instruction, such as the memory 1604 including an instruction, and the instruction may be executed by the processor 1620 of the apparatus 1600 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

It is to be noted that relational terms "first", "second" and the like in the present disclosure are adopted only to distinguish one entity or operation from another entity or operation but not to require or imply existence of any such practical relationship or sequence between the entities or operations. Terms "include" and "have" or any other variation thereof are intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an. . ." does not exclude existence of another element that is the same in a process, method, object or device including the element.

The method and apparatus provided in the embodiments of the present disclosure are introduced above in detail. The principle and implementation modes of the present disclosure are elaborated in the specification with specific examples. The embodiments are described above only to help the method of the present disclosure and the core concept thereof to be understood. In addition, those of ordinary skill in the art may make variations to the specific implementation modes and the scope of application according to the concept of the present disclosure. To sum up, the contents of the specification should not be understood as limits to the present disclosure.

What is claimed is:

1. A method for data transmission, comprising:
   receiving configuration information from a base station, the configuration information indicating whether a data packet deletion function is enabled or not at a Packet Data Convergence Protocol (PDCP) entity corresponding to a preset data bearer, wherein the configuration information includes multiple bits, of which one bit is for representing whether the data packet deletion function is enabled or not, and other bits are for representing the indicated preset data bearer;
   when the data packet deletion function is enabled at the PDCP entity corresponding to the preset data bearer, recording a duration for transmission of Service Data Units (SDUs) when the SDUs are transmitted from the PDCP entity corresponding to the preset data bearer to a Radio Link Control (RLC) layer;
   determining, from the SDUs, a first SDU that has not yet been transmitted to the RLC layer, in response to that the duration for transmission of the SDUs is longer than a preset duration; and
   in response to the first SDU being associated with a first Protocol Data Unit (PDU) and the first PDU being transmitted to the RLC layer, deleting only the first SDU and reserving the first PDU of the PDCP entity to avoid influence on the RLC layer and avoid missing of a Sequence Number (SN);
   in response to determining that the first SDU has been associated with the first PDU but the first PDU is not transmitted to the RLC layer, deleting the first SDU and the first PDU; and
   obtaining a set count value by setting a count value of another PDU, after the first PDU, to be transmitted to the RLC layer according to a count value of the first PDU,
   wherein the another PDU is generated according to an SDU corresponding to the another PDU and the SN in the set count value.

2. The method for data transmission of claim 1, wherein deleting the first SDU further comprises:
   deleting the first SDU in response to that the first SDU is not associated with the first PDU.

3. The method for data transmission of claim 1, wherein the configuration information is further configured to indicate whether a PDU deletion function is enabled or not at the PDCP entity corresponding to the preset data bearer.

4. The method for data transmission of claim 3, wherein deleting the first SDU further comprises:
   deleting the first SDU upon that when the first SDU is not associated with the first PDU, in response to that the PDU deletion function is not enabled at the PDCP entity corresponding to the preset data bearer.

5. An apparatus for data transmission, comprising:
   a processor; and
   a memory configured to store an instruction executable for the processor,
   wherein the processor is configured to:
   control a transceiver to receive configuration information from a base station, the configuration information indicating whether a data packet deletion function is enabled or not at a Packet Data Convergence Protocol (PDCP) entity corresponding to a preset data bearer, wherein the configuration information includes multiple bits, of which one bit is for representing whether the data packet deletion function is enabled or not, and other bits are for representing the indicated preset data bearer;
   when the data packet deletion function is enabled at the PDCP entity corresponding to the preset data bearer, record a duration for transmission of Service Data Units (SDUs) when the SDUs are transmitted from the PDCP entity corresponding to the preset data bearer to a Radio Link Control (RLC) layer;

determine from the SDUs a first SDU that has not yet been transmitted to the RLC layer in response to that the duration for transmission of the SDUs is longer than a preset duration; and in response to the first SDU being associated with a first Protocol Data Unit (PDU) and the first PDU being transmitted to the RLC layer, delete only the first SDU and reserve the first PDU of the PDCP entity to avoid influence on the RLC layer and avoid missing of a Sequence Number (SN);

in response to determining that the first SDU has been associated with the first PDU but the first PDU is not transmitted to the RLC layer, delete the first SDU and the first PDU;

obtain a set count value by setting a count value of another PDU, after the first PDU, to be transmitted to the RLC layer according to a count value of the first PDU; and generate the another PDU according to an SDU corresponding to the another PDU and an SN in the set count value.

6. The apparatus for data transmission of claim 5, wherein the processor is configured to delete the first SDU, in response to that the first SDU is not associated with the first PDU.

7. The apparatus for data transmission of claim 5, wherein the configuration information is further configured to indicate whether a PDU deletion function is enabled or not at the PDCP entity corresponding to the preset data bearer.

8. The apparatus for data transmission of claim 7, wherein the processor is configured to, in response to that the PDU deletion function is not enabled at the PDCP entity corresponding to the preset data bearer, delete the first SDU upon that when the first SDU is not associated with the first PDU.

* * * * *